(12) United States Patent
Lucaci et al.

(10) Patent No.: US 6,968,508 B2
(45) Date of Patent: Nov. 22, 2005

(54) ROTATING USER INTERFACE

(75) Inventors: Iulius Lucaci, Schaumburg, IL (US); Peter J. Ina, Arlington Heights, IL (US); Christopher B. Fruhauf, San Francisco, CA (US)

(73) Assignee: Motorola, Inc., Schumburg, IL (US)

( * ) Notice: Subject to any disclaimer, the term of this patent is extended or adjusted under 35 U.S.C. 154(b) by 249 days.

(21) Appl. No.: 10/208,148

(22) Filed: Jul. 30, 2002

(65) Prior Publication Data

US 2004/0021702 A1  Feb. 5, 2004

(51) Int. Cl.[7] ............................................. G06F 3/00
(52) U.S. Cl. ...................................... 715/784; 715/973
(58) Field of Search ................................. 345/700–701, 345/784, 156; 379/93.17, 93.19, 93.23; 455/550, 455/556–557, 566, 575, 95; 715/700–701, 715/784–787, 973, 156

(56) References Cited

U.S. PATENT DOCUMENTS

| | | | | |
|---|---|---|---|---|
| 5,444,671 | A | * | 8/1995 | Tschannen et al. ............ 368/10 |
| 5,754,645 | A | * | 5/1998 | Metroka et al. ........ 379/433.12 |
| 5,841,849 | A | * | 11/1998 | Macor .................... 379/142.17 |
| 5,982,710 | A | * | 11/1999 | Rawat et al. .................. 368/21 |
| 6,224,254 | B1 | * | 5/2001 | Hayek et al. ................ 368/281 |
| 6,535,461 | B1 | * | 3/2003 | Karhu .......................... 368/10 |
| 6,556,222 | B1 | * | 4/2003 | Narayanaswami .......... 345/786 |
| 6,766,182 | B2 | * | 7/2004 | Janninck et al. .......... 455/575.3 |

* cited by examiner

*Primary Examiner*—Sy D. Luu
(74) *Attorney, Agent, or Firm*—David S. Noskowicz

(57) ABSTRACT

A wireless communication handset (100) having a movable bezel input device (230) coupled to a housing portion (220) that rotates in substantially parallel planes. Rotation of the bezel input device in a first direction moves information on a display 250 in a first direction. Rotation of the bezel input device moves information in a second direction. Depressing a first portion of the bezel input device moves the text in a third direction and depressing a second portion of the bezel input device moves the information in a fourth direction.

15 Claims, 10 Drawing Sheets

ROTATING USER INTERFACE

FIELD OF THE INVENTIONS

The present invention relates generally to user interfaces of communication devices, and more particularly to rotating user interfaces to control functions of the device.

BACKGROUND OF THE INVENTIONS

Portable electronic devices, particularly wireless communication devices, may incorporate features or portions of the device that increase both functionality and ease of use by the user Clamshell style cellular communications handsets that operate the hook switch when a hinged portion of the housing is opened and closed are known generally. The V.70/V.71 cellular telephones by Motorola, Inc., for example, includes a rotatable blade used as a hook switch detector that transitions the phone between stand-by and active modes depending on the position of the blade.

The ability to control the operation of the device in light of increased functionality has required increasing the number of buttons or increasing the number of functions assigned to individual buttons or both. In either case, the complexity of operation increased and intuitive control decreased.

User replaceable features of a device allow the user to change functionality or the look and feel of the device to match their needs or style. However, to ensure the integrity of the device, and maintain a robust design, the interchangeable parts or portions must form together and not fall apart on the user. This on the other hand makes it difficult if not impossible for the ser to interchange the interchangeable portion without the aid of tools or even having to take the device to the vendor to exchange the interchangeable portion. This is undesirable for the user and the supplier as it makes the device and interchangeable portions less desirable and as a result less profitable.

Accordingly, a system is needed to improve the control of the operation of such devices, yet maintain the astrictive outward appearance that the end users desires. Providing a means to easily interchange portions of the device while maintain the integrity and robustness of the device is needed The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

According to the invention, generally, a input device is operated by moving a bezel input device in various direction, though rotating, twisting or depressing portions thereof to control the motion of information on a display. More particularly the invention is a wireless communication device comprising a housing with a rotating portion rotatably coupled to the housing within substantially the same plane. The rotatable portion rotatable in a first direction and rotatable in a second direction and a display coupled to said housing. The display scrolls or moves information in a first direction on the display in response to rotating the rotatable portion in the first direction and scrolling information in a second direction on the display in response to rotataing said rotatable portion in the second direction.

The wireless communication device further comprises a first switch coupled to the rotating portion, scrolling information on said display in a third direction in response to activation of said first switch, and a second switch coupled to the rotating portion and scrolling information on said display in a fourth direction in response to activation of the second switch.

Figure 1:
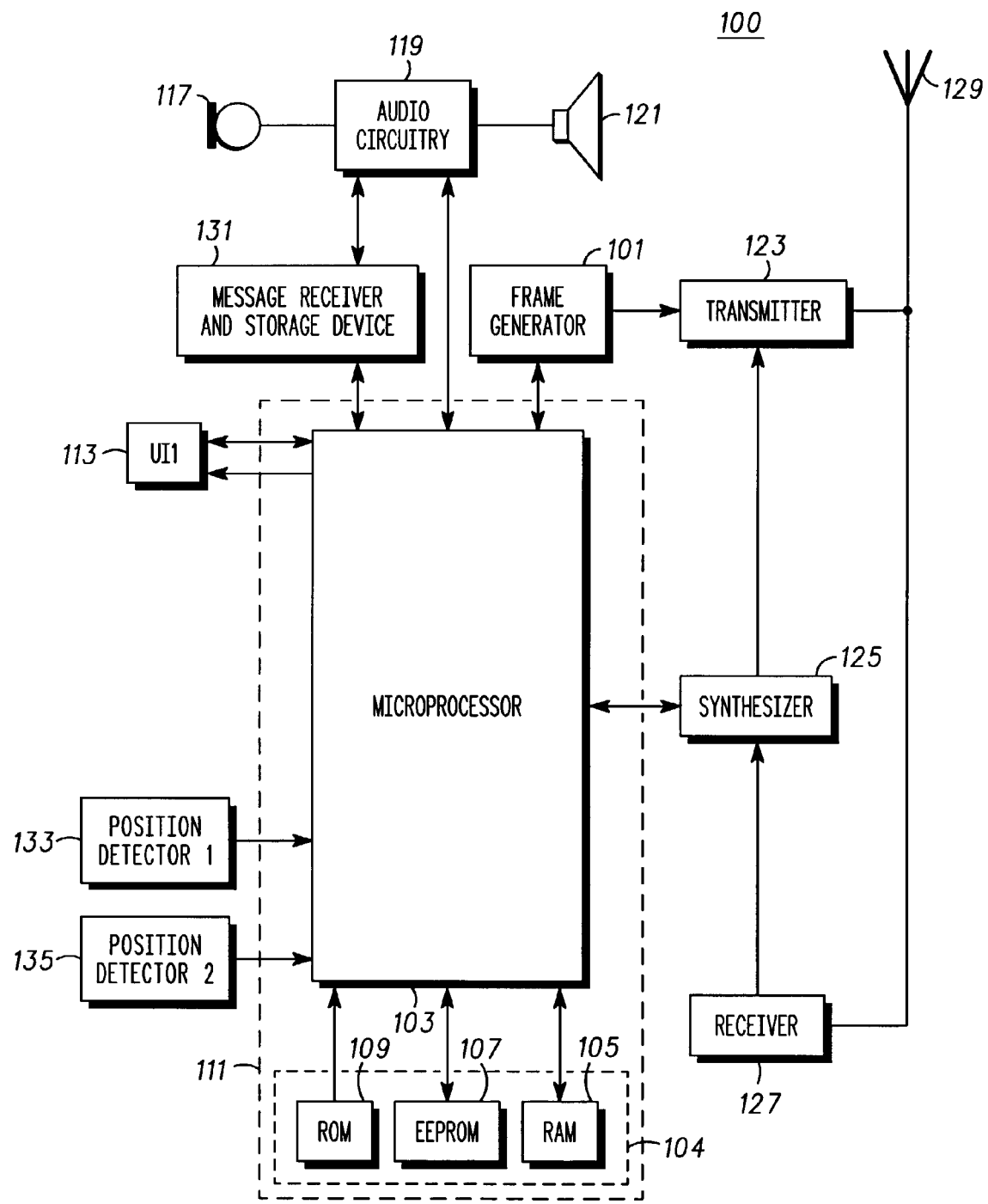
FIG. 1 is an exemplary view wireless communication handset circuitry.

Turning now to FIG. 1, an exemplary wireless communication device or handset such as a cellular radiotelephone comprises, a frame generator ASIC 101, such as a CMOS ASIC available from Motorola, Inc. and a microprocessor 103, such as a 68HC11 microprocessor also available from Motorola, Inc., combine to generate the necessary communication protocol for operating in a cellular system. Microprocessor 103 uses memory 104 comprising RAM 105, EEPROM 107, and ROM 109, preferably consolidated in one package 111, to execute the steps necessary to generate the protocol and to perform other functions for the wireless communication device, such as writing to a user interface or display 113, accepting input from a position detector 133 and 134 such as a ESE23 or ESE 24 2W detector switch available from Panasonic, or controlling a frequency synthesizer 125. ASIC 101 processes audio transformed by audio circuitry 119 from a microphone 117 and to a speaker 121.

Figure 2:
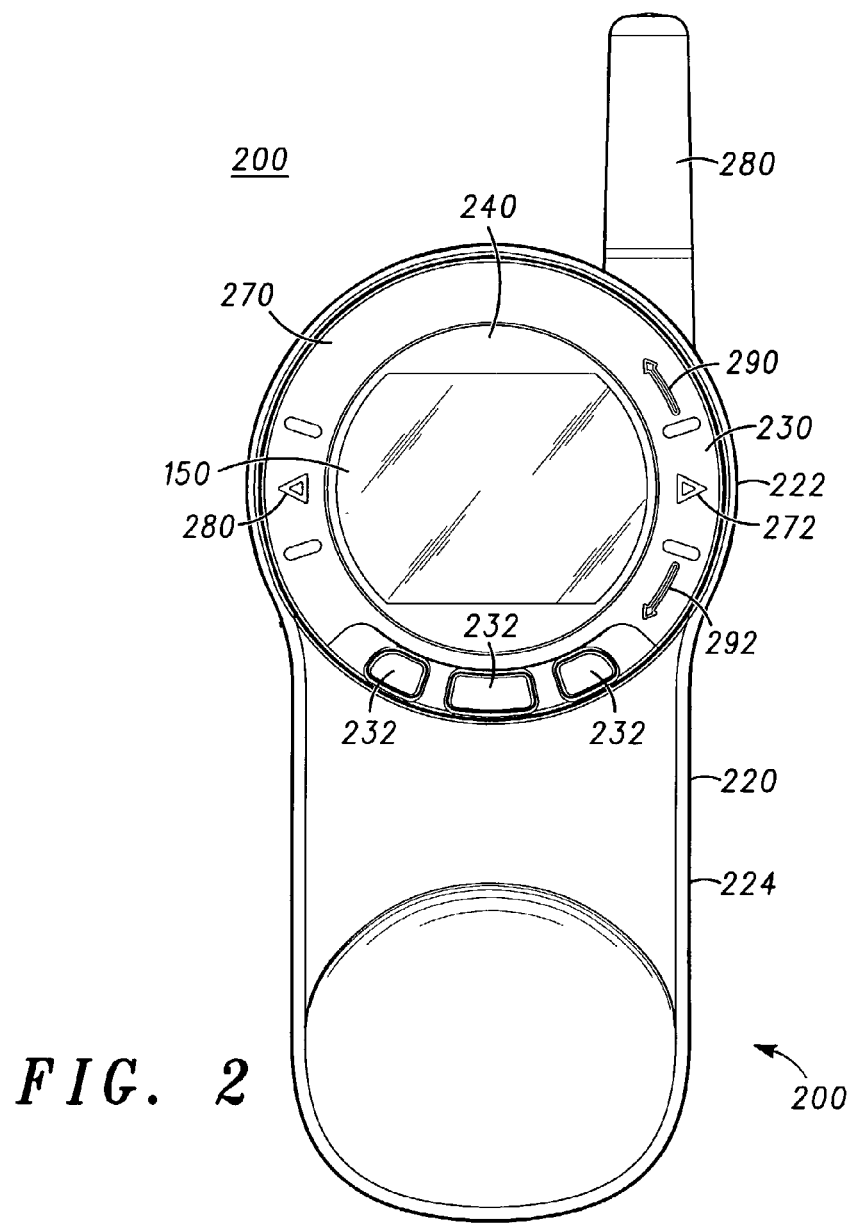
FIG. 2 is an exemplary view of the handset of the invention.

Referring to FIG. 2, there is provided a collapsible radiotelephone or handset 200 in a closed position 210. The handset 200 has wireless communication capabilities and, thus, may be used to communicate with wireless infrastructure, such as cellular base stations, regional and local wireless transponders, and wireless local area networks. The handset 200 described herein is a representation of the type of wireless communication device that may benefit from the present invention. However, it is to be understood that the present invention may be applied to any type of portable electronic device and is not limited to the following devices: radiotelephones, cordless phones, paging devices, personal digital assistants, portable computers, pen-based or keyboard-based handheld devices, remote control units, audio players (such as MP3 players) and the like. Accordingly, at least for the present invention the radiotelephone 100 is equivalent to other portable electronic devices, non-limiting examples of which were provided above.

Also shown in FIG. 2, the handset 200 housing comprises an upper housing 220 having a generally elongated and planar shape. The upper housing 220 has an upper circular portion 222 at one end and an upper extending portion 224 extending away from the upper circular portion. For this closed position 210, the upper circular portion 222 and the upper extending portion 224 are adjacent to a lower housing. An external antenna 280 or internal antenna (not shown) may be provided to enhance the wireless communication capabilities of the handset 200.

Components of the handset 200 are positioned near the upper circular portion 222 including a movable housing portion that is an input device or bezel input device 230, a lens 240, and a display 250. The bezel input device 230 has a ring-like shape that encompasses the display 250. The bezel input device 230 has indicia on the outer surface 270. These indicia indicate the direction of rotation; either with a counterclockwise rotation indicia 290, or a clockwise rotation indicia 292. A right arrow indicia 272 and a left arrow indicia 280 indicate the portion of the outer surface to depress to activate a switch coupled to the bezel input device 230. The bezel input device 230 rotates about a first axis around the display. In addition, the bezel input device 230 rotates about a second axis or is depressible such that the portion of the bezel input device 230 located at either the right arrow indicia 272 or the left arrow indicia may be depresses or deformed to activate a switch or sensor (not shown) coupled between the bezel input device 230 and the housing. In addition, the housing portion 220 may include housing portion selection buttons 232 and/or indicator lights (not shown) to provide additional functionality to the handset 200. For example, three cover selection keys 232: a left selection key, and right selection key and a menu key therebetween. If another desired function is required, the user could interchange the present bezel input device 230 with a different bezel (not shown) having new or different buttons with different indicia.

The display 250 may be any type of output device that provides a convenient display of text and/or graphics to the user. Preferably, the display 250 is a liquid crystal display having a backlighting system to illuminate the display when lighting conditions are insufficient for proper viewing by the user. The lens 240 may also function to locks certain components of the handset 200 together as well as the display lens to protect the display 250 from undesirable, foreign matter. The bezel 230 may interact with the display 250 and the bezel 230 may be interchanged to match multiple colors of the display for example.

Referring to FIG. 2 still, the upper housing 220 may include one or more selection buttons (such as selection buttons 232 and 260) for various types of features including, but not limited to, volume control, menu control, call answering, call termination, caller identification, phone book control, voicemail control, e-mail/messaging control, network browsing, power on/off, and the like.

Figure 3:
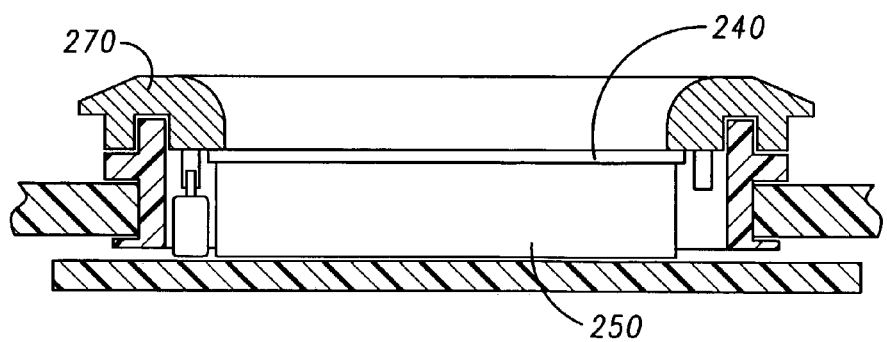
FIG. 3 is an exemplary crass sectiomn view of the invention.

In FIG. 3, an exemplary cross section of the housing comprises the housing 220, the bezel input device 230, an actuator 310, a poppel 312 a switch 314, and the glass lens 316. The first axis or rotation 318 is also shown.

Figure 4:
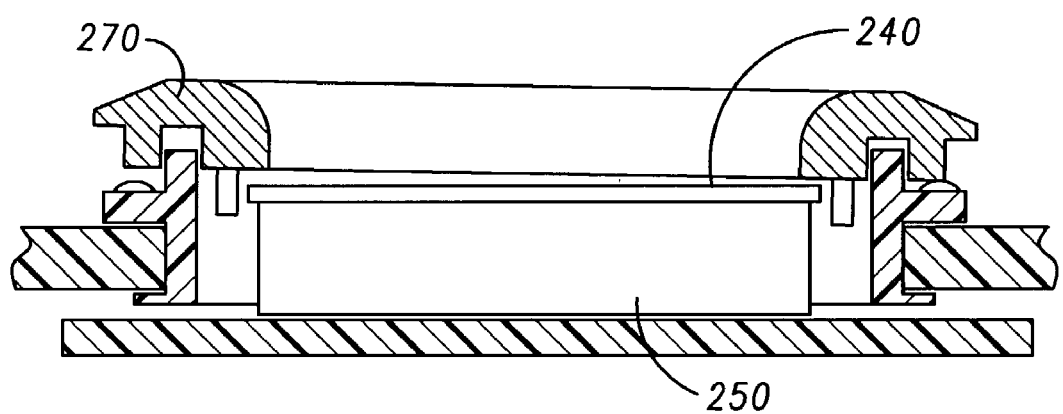
FIG. 4 is an exemplary cross section of the invention.

FIG. 4 is an exemplary cross section showing the depression of the bezel input device activating the switch 314. A poppel may or may not be present. The poppel 312 adds user feedback to the switch activation to give the user a tactile feedback that the switch has been activated.

Figure 5:
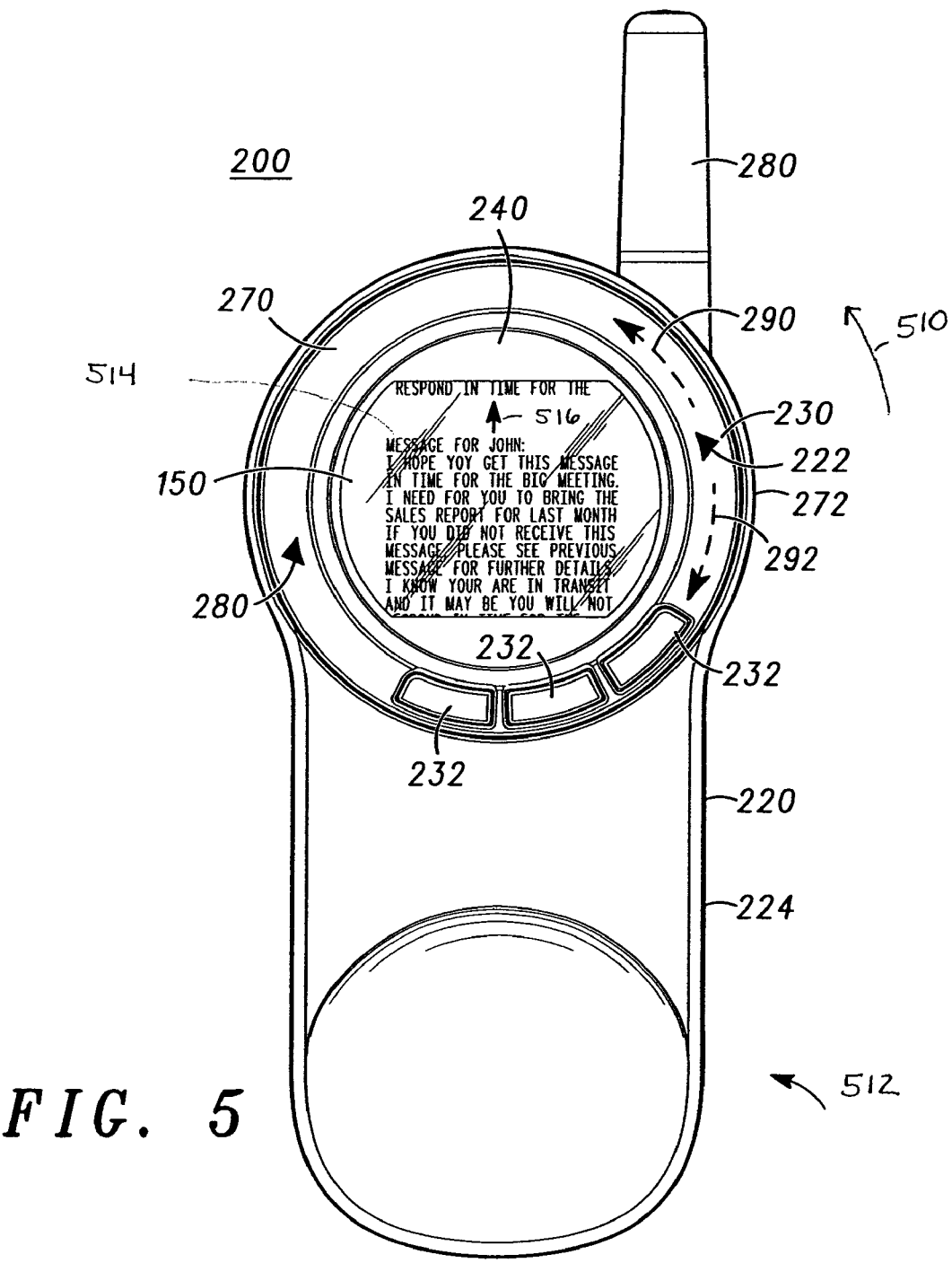
FIG. 5 is an exemplary view of the moving information of the invention.

In FIG. 5, the handset 201 is shown with the bezel 230 rotated from a first position 200 in a first direction 510, which is a counterclockwise direction 510 in this exemplary view, to a second position 512. In this instance the second position is provided by a physical stop that prevents the bezel input device 230 from rotating beyond the second position 512. The text 514 written to the display 250 is shown moving or scrolling upward or to the top 516 of the display 250. This direction is exemplary and may be other motions or directions or multiple directions. If the bezel 230 is spring loaded, the user can release the bezel 230 and the spring force will return the bezel 230 to the first position 200 which is a neutral position.

In another instance, the bezel rotates freely in a 360 degree circle without any stops. As the bezel input device 230 is rotated in the first or counterclockwise direction 510, the information on the display 250 is shown moving as long as the bezel input device is rotating. Stopping the rotating motion of the bezel input device 230 stops the motion of the information on display 250.

Figure 6:
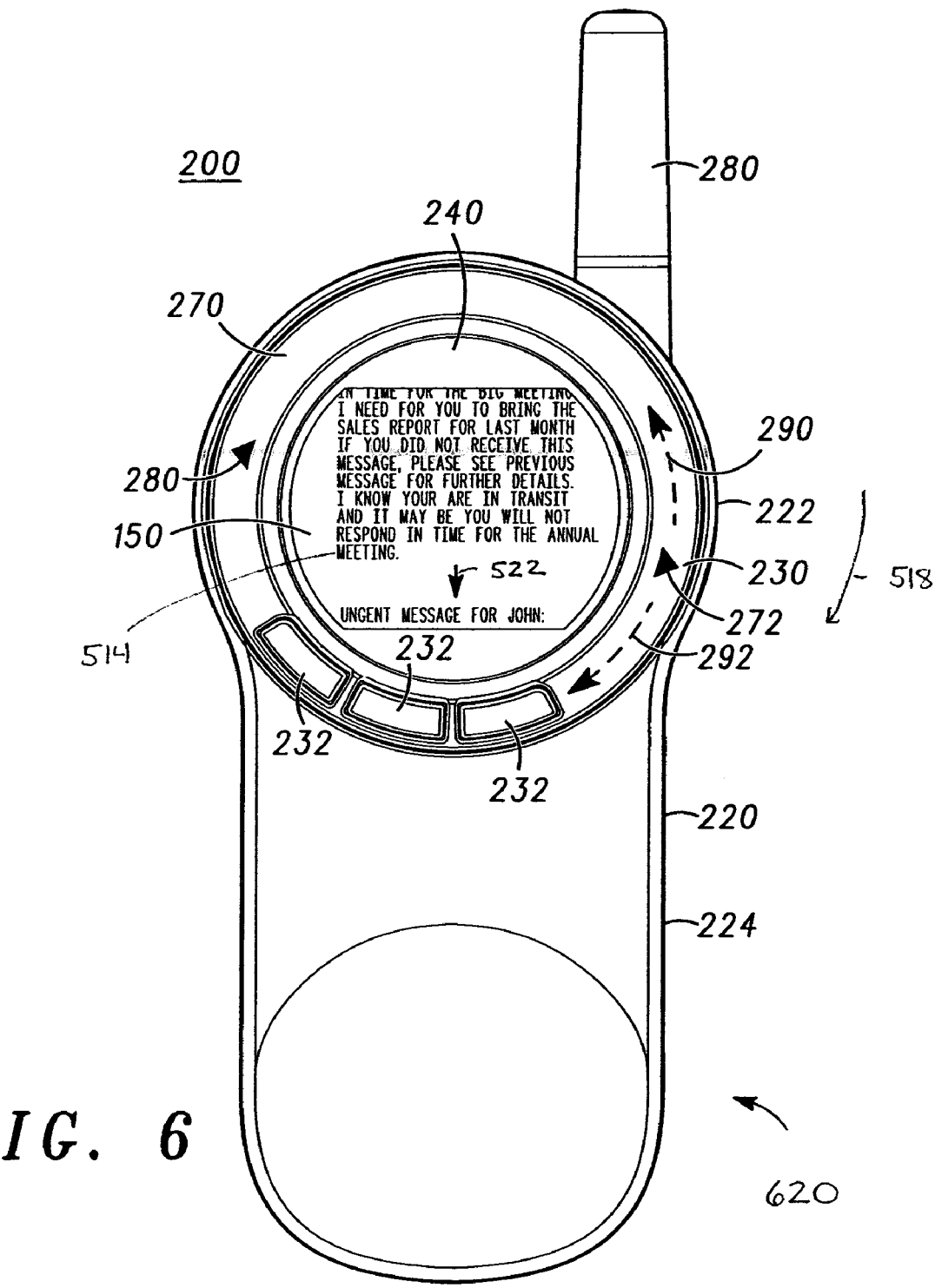
FIG. 6 is an exemplary view of the moving information of the invention.

In FIG. 6, the handset 200 is shown with the bezel 230 rotated from a first position 201 in a second direction 518, which is a clockwise direction in this exemplary view, to a third position 620. The text 514 written to the display 250 is shown moving or scrolling downward or to the bottom 522 of the display 250. This direction is exemplary and may be other motions or directions or multiple directions. If the bezel 230 is spring loaded, the user can release the bezel 230 and the spring force will return the bezel 230 to the first position 200, which is a neutral position.

In another instance, the bezel input device 230 rotates freely as described above however this time as the bezel input device 230 is rotated freely in the second or clockwise direction 518, the information on the display 250 is shown moving or scrolling downward or to the bottom 522 of the display and continues to do so as long as the bezel input device 230 is in motion. Stopping the rotating motion of the bezel input device 230 stops the motion of the information on display 250. In this case the selection keys 232 are locate on the bezel input device 230.

Figure 7:
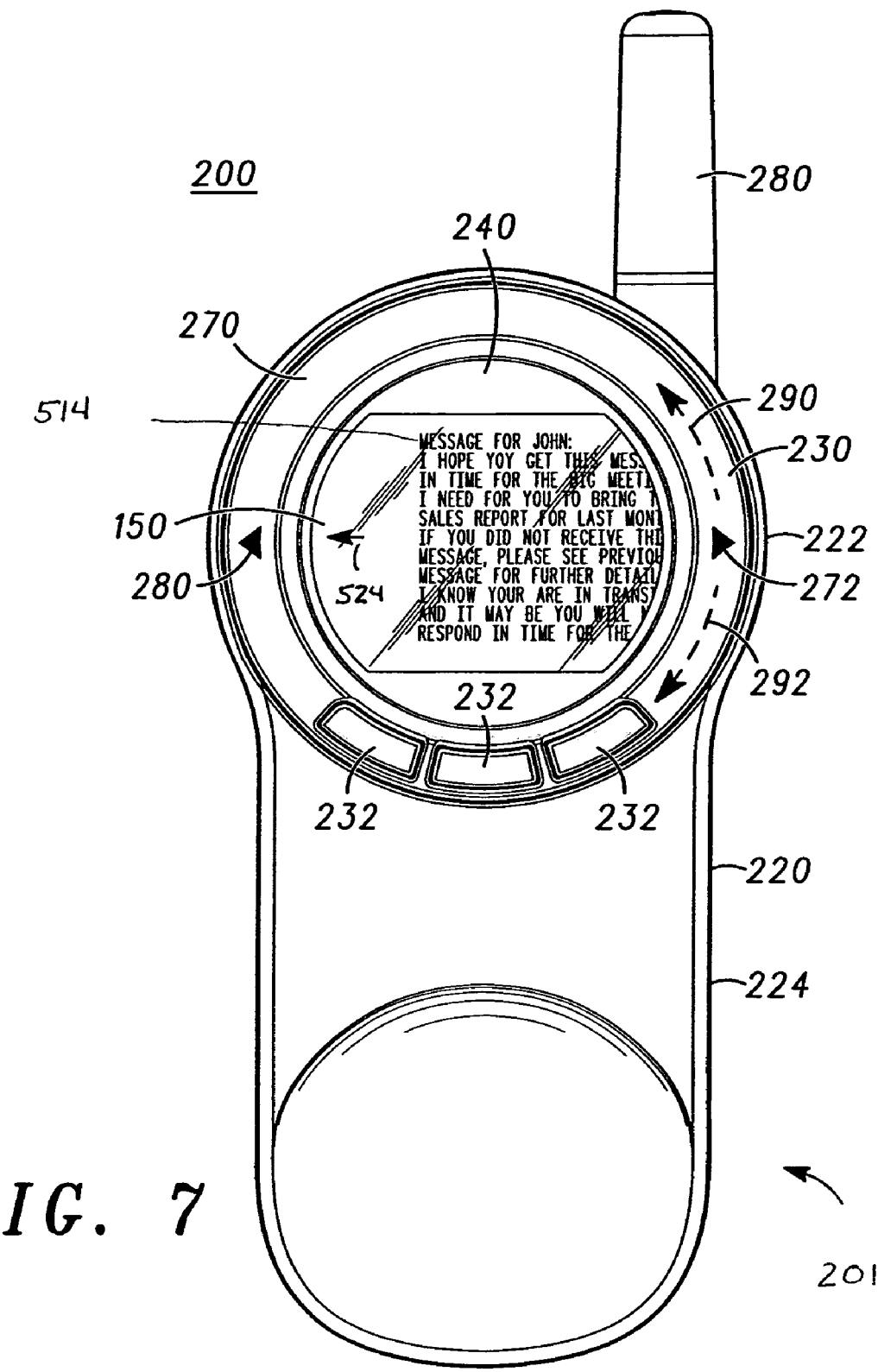
FIG. 7 is an exemplary view of the moving information of the invention.

In FIG. 7 the bezel input device 230 is in the first or neutral position 201. The text 514 written to the display 250 is shown moving or scrolling right or to the right side 524 of the display 250. If the bezel is not in the neutral position the information on the display may move toward the portion of the bezel input device being depressed.

Figure 8:
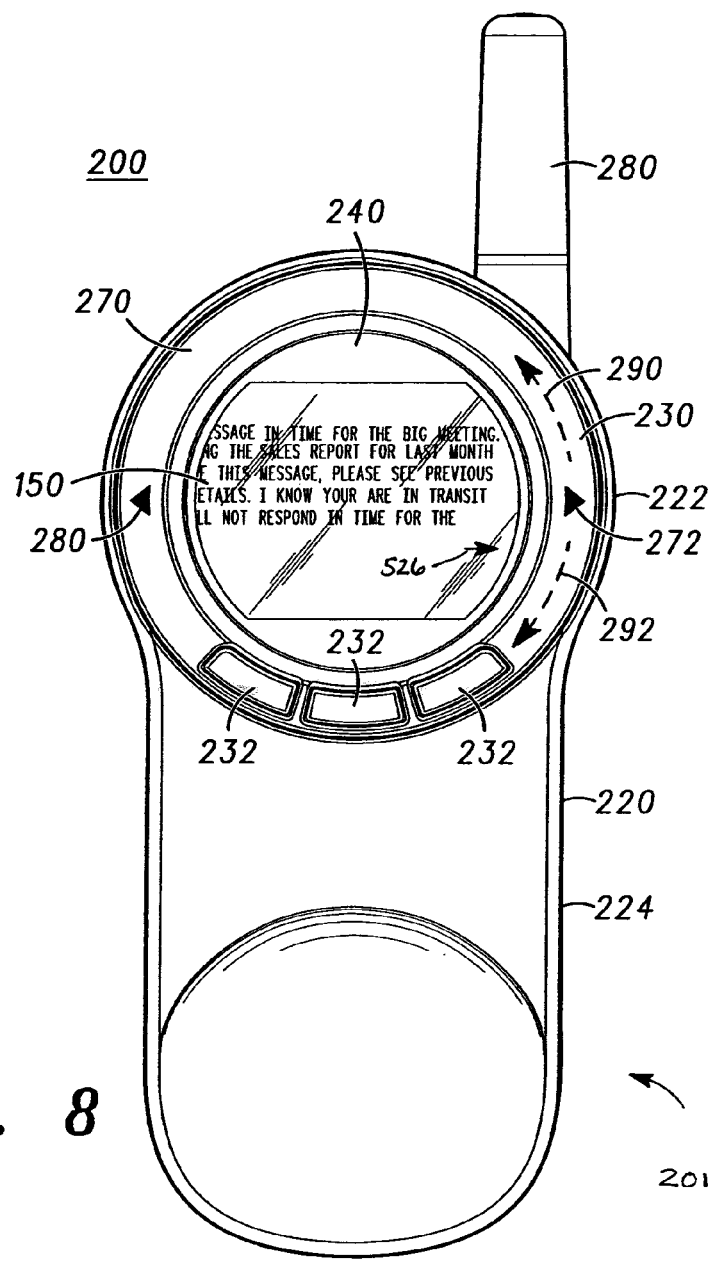
FIG. 8 is an exemplary view of the moving information of the invention.

In FIG. 8 the bezel input device 230 is in the first or neutral position 201. The text 514 written to the display 250 is shown moving or scrolling left or to the left side 526 of the display 250. If the bezel is not in the neutral position the information on the display may move toward the portion of the bezel input device being depressed.

Moving or scrolling information on the display applies to anything displayed on the display 230 to the user. According to the present invention, scrolling information on the display means positioning or moving a cursor or other object or icon about the display. Scrolling information also means scrolling through a predetermined selection of data shown on the display 250.

Figure 9:
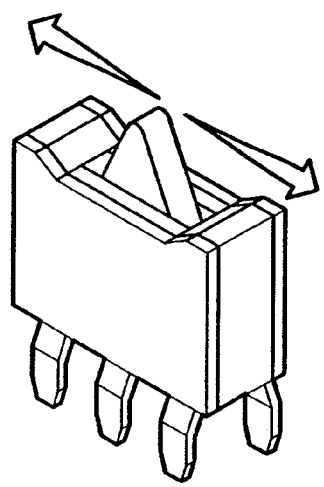
FIG. 9 is an exemplary view of the moving information of the invention.

Converting the mechanical motion of the bezel input device into electrical signals that are sent to the processor 103 is done with switches or sensors coupled to the bezel input device 230 and the housing 220. In FIG. 9 a first switch is shown. This first switch is a detector switch, such as an ESE 23 or ESE 24 from Panasonic. The switch lever 902 in a normally open position when it is in a first or stationary position. The switch lever 902 can move in two directions, a first direction 904 and a second direction 906. The switch lever is spring loaded such that a force applied in either direction moves the lever and when the force is removed from the switch lever 902, the switch lever 902 will spring back to the first or stationary position.

When the switch lever is moved in the first direction 904, a first circuit between the contacts 910 and 912 is complete or closed and when the switch lever 902 is moved in the second direction 906, a second circuit between the contacts 914 and 912 is completed or closed.

Figure 10:
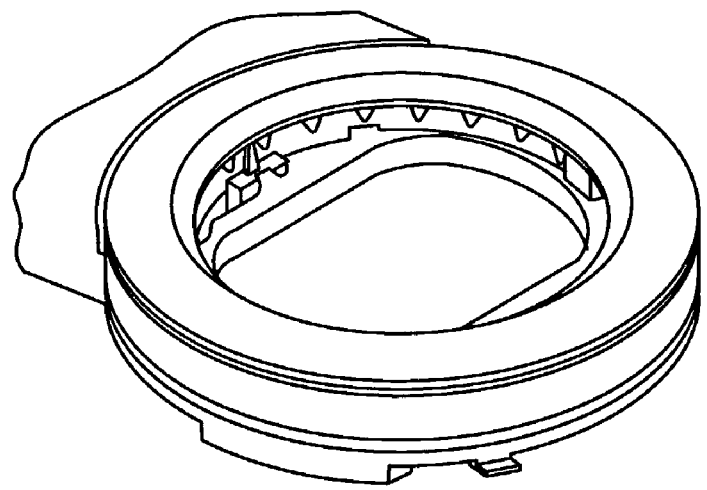
FIG. 10 is an exemplary view of the bezel input device invention.
Figure 11:
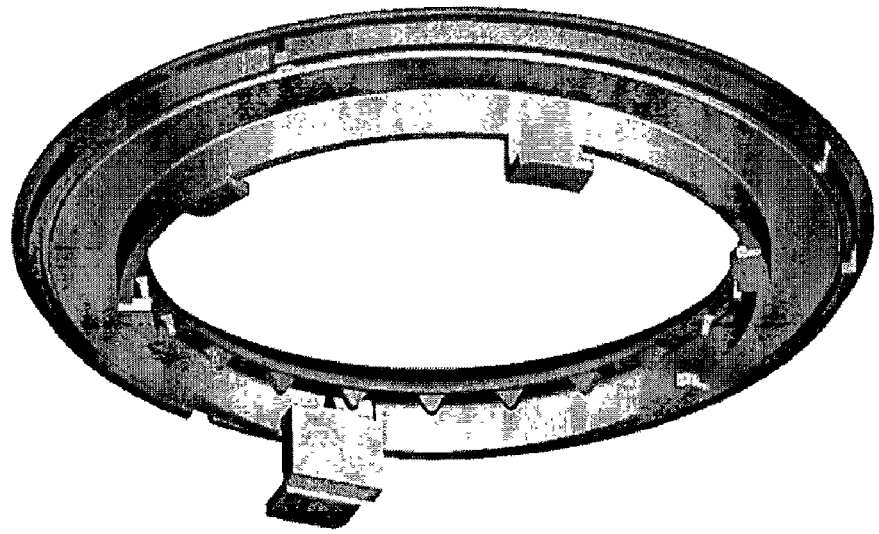
FIG. 11 is an exemplary view of the bezel input device invention.

This switch is coupled to the housing 220 as shown in FIG. 10. The switch lever 902 is position such that it will selectively couple with actuators or teeth 1002 which are coupled to the bezel input device 230. The teeth 1002 rotate with the bezel input device and as the bezel input device rotates, the teeth 1002 selectively couple to the switch lever 902 and depending on the direction of rotation, move the lever in either the first direction 904 or the second direction 906. In the instance discussed above where the bezel input device has a hard stop and rotates less than 45 degrees, only one actuator or tooth is coupled to the bezel input device 230. When the bezel input device is rotated to the second position 518, a first actuator couples with the switch lever and moves the switch lever in the first direction 904. The circuit between 910 and 912 is closed and a signal is sent to the processor 103. The processor generates the command to move the text in upward or towards the top of the display 250. When the bezel input device is rotated to the third position 620, a second actuator couples with the switch lever 902 and moves the switch lever 902 in the second direction 906. The circuit between 910 and 912 is closed and a signal is sent to the processor 103. The processor generates the command to move the text upward or towards the top of the display 250.

In the case of the freely rotating bezel input device, a plurality of teeth are selectively coupled to the bezel input device 230 as the bezel input device rotates in either direction. Each time a tooth couples with said switch lever, the switch lever is moved in the first or second direction, depending upon the roation direction of the bezel input device, and either the first circuit or second circuit is closed. Rotating the bezel input device in one direction allows a plurality of teeth to selectively couple to the switch lever and repeatedly move the switch lever in the same direction. The affect is that the information on the display 250 is scrolled in one coinciding direction, either up or down.

The microprocessor or processor 103 can be configured to control the motion of the information on the display 250 in conjunction with the input from the bezel input device 230. For example, in one instance, the release of the bezel allowing it to return to the first position, automatically stops the motion of the information on the display. If the bezel input device is not spring loaded, the user may rotate the bezel manually back to the first position 2XX to stop the scrolling motion. In another instance, the information on the display continues to move once the bezel is released and returns to the first position. In order to stop the motion of the information on the display 250, the bezel input device must be rotated from the first position XXX in the second direction to the third postion 6XX. In the first position, the information on the display 250 does not move.

The relative positions of the housing portions may also be detected by a rotary encoder having a first encoder portion coupled to one of the housing portions and a relatively fixed encoder portion coupled to the other housing portion. In the exemplary wireless communication handset application, the rotary encoder has a standby mode electrical output when the housing portions are in the standby configuration, an active mode electrical output when the housing portions are in the active mode configuration, and corresponding functional electrical outputs when the housing portions are configured for the corresponding functions. The functions may be active mode or standby mode functions.

Figure 12:
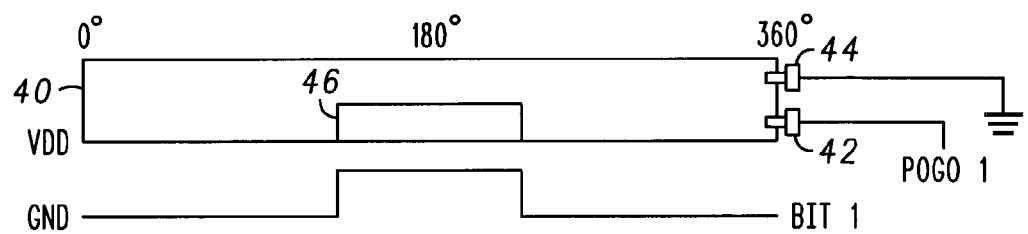
FIG. 12 is an exemplary one-bit rotary encoder and corresponding digital encoder output diagram.

FIG. 12 illustrates a first exemplary rotary encoder embodiment comprising a partially conductive strip 40 with bit patterns formed thereon. The strip 40 is formed into a ring and fastened to one housing portion. At least two conductors, for example, pogo pins 42 and 44, are coupled to the other housing portion so that the pins are in contact with the conductive strip.

Figure 13:
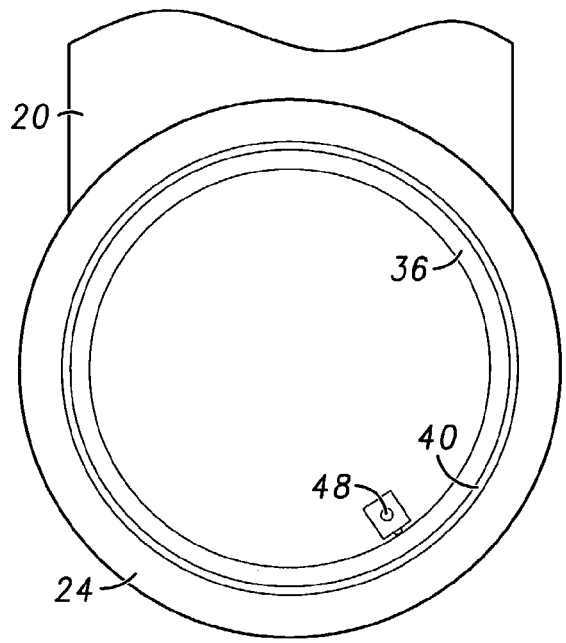
FIG. 13 is sectional view of an exemplary rotatable housing portion having a first exemplary rotary encoder.
Figure 14:
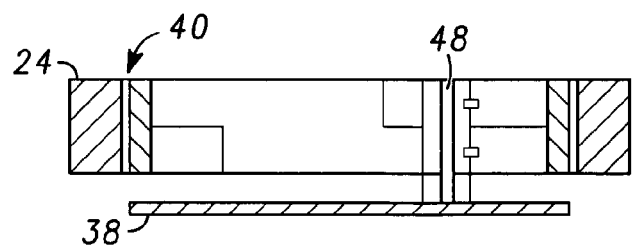
FIG. 14 is a section view of a portion of a rotatable housing.

In FIGS. 13 and 14, the conductive strip 40 is disposed on an inner surface of a housing ring 24, which is part of the bezel input device 230 in the exemplary embodiment. Alternatively, the bit pattern may be formed directly on the surface of the bezel input device 230, for example by depositing conductive and non-conductive materials thereon. FIG. 13 illustrates a pogo pin mounting assembly 48 mounted on an inner ring 36 of the main housing portion, and FIG. 4 illustrates the pogo pin mounting assembly 48 disposed on a circuit board 38.

Figure 15:
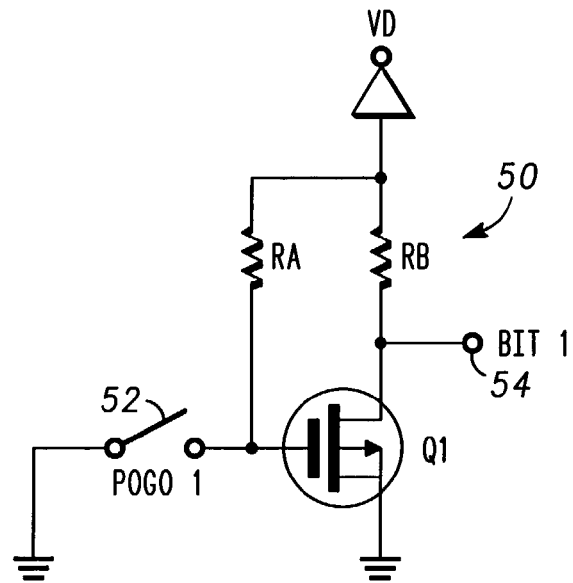
FIG. 15 is a first exemplary pull-down circuit.
Figure 16:
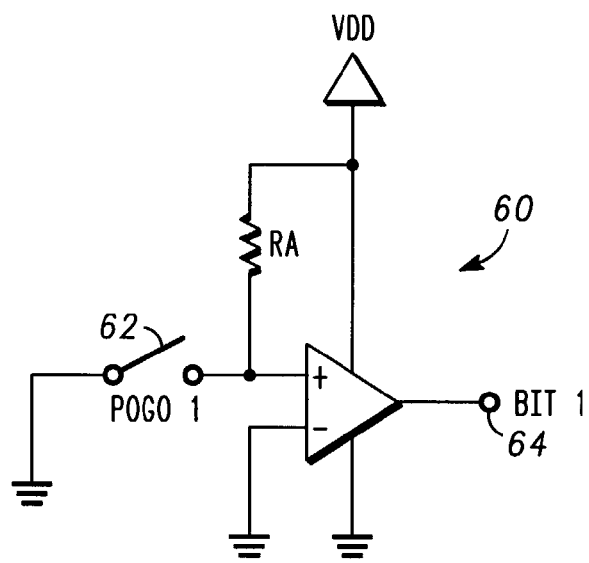
FIG. 16 is a second exemplary pull-down circuit.

The conductors of the rotary encoder are coupled to an electrical circuit that detects when an electrical connection between the conductors is made and broken by conductive and non-conductive portions of the strip. FIGS. 15 and 16 illustrate exemplary voltage pull-down circuits 50 and 60, respectively, with corresponding switches 52 and 62 representative of the contact made between the conductors of the rotary encoder. The generation of electrical connections is then sent to the processor 103. The processor 103 interprets the input signals from the rotary encoder and sends commands to the display to move the text accordingly.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A wireless communication device comprising:
   a housing;
   a rotating portion rotatably coupled to said housing within substantially the same plane, the rotatable portion rotatable in a first direction and rotatable in a second direction;
   a display coupled to said housing,
   scrolling information in a first direction on said display in response to rotating said rotatable portion in said first direction, and
   scrolling information in a second direction on said display in response to rotataing said rotatable portion in said second direction;

a first switch coupled to said rotating portion, scrolling information on said display in a third direction in response to activation of said first switch; and a second switch coupled to said rotating portion, scrolling information on said display in a fourth direction in response to activation of said second switch.

2. The wireless communication device of claim 1, said rotating portion is a bezel, encompassing said display, the bezel having a first activation portion and a second activation portion.

3. The wireless communication device of claim 2, rotating 90 degrees counterclockwise in said first direction to said first position and rotating 90 degrees clockwise in said second direction to said second position.

4. The wireless communication device of claim 3, scrolling information in a first direction on said display in response to depressing said first activation portion of said bezel, rotated 90 degrees counterclockwise to a first position, and scrolling information in a second direction on said display in response to depressing said first activation portion of said bezel, rotated 90 degrees clockwise to a second position.

5. The wireless communication device of claim 2, said rotating portion rotating less than 45 degrees counterclockwise in said first direction to said first position and rotating less tan 45 degrees clockwise in said second direction to said second position.

6. The wireless communication device of claim 5, scrolling information in a first direction on said display in response to rotating said rotating portion less than 45 degrees counterclockwise in said first direction to said first position, and scrolling information in a second direction on said display in response to rotating said rotating portion less than 45 degrees clockwise in said second direction to said second position.

7. The wireless communication device of claim 6, a right scroll button coupled to said bezel and said housing such that when said bezel is depressed at said first activation portion adjacent to a right side of said display, said right scroll button is activated and information on said display scrolls from left to right;

a left scroll button coupled to said bezel and said housing such that when said bezel is depressed at a second activation portion adjacent to a left side of said display, said left scroll button is activated and information on said display scrolls left.

8. The wireless communication device of claim 2, a right scroll button coupled to said bezel and said housing such that when said bezel is depressed at said first activation portion adjacent to a right side of said display, said right scroll button is activated and information on said display scrolls from left to right;

a left scroll button coupled to said bezel and said housing such that when said bezel is depressed at a second activation portion adjacent to a left side of said display, said left scroll button is activated and information on said display scrolls left.

9. The wireless communication device of claim 1, a rotary encoder having a first encoder portion coupled to said rotation portion and a stationary encoder portion, the rotary encoder having a first active mode function output when said rotation portion is in said first direction, the rotary encoder having a second active mode function output when said ration portion is in said second direction.

10. The wireless communication handset of claim 9, said display performing a first scrolling function in response to the first active mode function output of the rotary encoder, said display performing a second scrolling function in response to the second active mode function output of the rotary encoder.

11. A method in a portable communication handset, comprising:

rotating a bezel from a first position in a first direction about a first axis to a second position;

moving information on a display of the portable communication handset in response to said bezel rotation in said first direction;

rotating said bezel from said first position in a second direction about said first axis to a third position;

moving information on said display of the portable communication handset in response to said bezel rotation in said second direction;

depressing a first portion of said bezel while in said first position;

scrolling information on said display of the portable communication handset in a third direction in response to depressing a first portion of said bezel;

depressing a second portion of said bezel while in said first position; and scrolling information on a display of the portable communication handset in a fourth direction in response to depressing said second portion of said bezel.

12. The method of claim 11, rotating a bezel from a first position in a first direction to a second position;

depressing a first portion of said bezel scrolling information on a display of the portable communication handset in a first direction;

depressing a second portion of said circular bezel; and scrolling information on a display of the portable communication handset in a second direction.

13. The method of claim 11, rotating said bezel from a first position 90 degrees relative to said display in a first direction;

depressing a first portion of said circular bezel;

scrolling information on a display of the portable communication handset in a first direction;

rotating said bezel from said first position 90 degrees relative to said display in a first direction;

depressing a second portion of said bezel; and scrolling information on a display of the portable communication handset in a second direction.

14. The method of claim 11, rotating said bezel less then 45 degrees from a first position in a first direction about a first axis to a fifth position;

rotating said bezel less than 45 degrees from said first position in a second direction about said first axis to a sixth position; and rotating said bezel back to said first position.

15. The method of claim 11,
rotating a spring loaded bezel in said first direction from said first position to said second position;
scrolling information on a display of the portable communication handset in a first scrolling direction;
releasing said bezel so as to allow a spring of the spring loaded bezel to return said spring loaded bezel to said first position;
rotating said spring loaded bezel in said second direction from said first position to a second position;
scrolling information on a display of the portable communication handset in a second scrolling direction; and
releasing said bezel so as to allow said spring of the spring loaded bezel to return said spring loaded bezel to said first position.

\* \* \* \* \*